United States Patent [19]

Raj

[11] 4,357,022
[45] Nov. 2, 1982

[54] FERROFLUID ROTARY-SHAFT SEAL APPARATUS AND METHOD

[75] Inventor: Kuldip Raj, Merrimack, N.H.

[73] Assignee: Ferrofluidics Corporation, Nashua, N.H.

[21] Appl. No.: 208,288

[22] Filed: Nov. 19, 1980

[51] Int. Cl.³ .............................................. F16J 15/40
[52] U.S. Cl. ........................................ 277/1; 277/80; 277/135
[58] Field of Search ............... 277/1, 80, 135, DIG. 7; 308/10, 36.1, 187.1, 187.2

[56] References Cited

U.S. PATENT DOCUMENTS 4,304,411  12/1981  Wilcock et al. ................. 277/80

FOREIGN PATENT DOCUMENTS 631726  11/1978  U.S.S.R. ................. 277/80
742657  6/1980  U.S.S.R. ................. 277/80

Primary Examiner—Robert S. Ward, Jr.
Attorney, Agent, or Firm—Richard P. Crowley

[57] ABSTRACT

A ferrofluid rotary-shaft seal apparatus of extended seal life particularly adapted for use as an exclusion seal with a computer-disc-drive spindle, which seal apparatus comprises: an annular permanent magnet; first and second pole pieces of unequal width, one end of each pole piece extending into a close, noncontacting relationship with the surface of the shaft, to form a gap width between the one end of the pole piece and the surface of the shaft; and ferrofluid in the gap widths to form a ferrofluid O-ring seal, whereby, in operation, the ferrofluid, under the thinner pole piece, evaporates and forms an air gap, while the ferrofluid at the wider gap width provides extended seal life.

22 Claims, 2 Drawing Figures

FERROFLUID ROTARY-SHAFT SEAL APPARATUS AND METHOD

BACKGROUND OF THE INVENTION

Ferrofluid-type seal apparatuses for use in sealing rotary shafts, with single- and multiple-stage, ferrofluid-liquid, O-ring seals about the shaft, are well known (see, for example, U.S. Pat. No. 3,620,584 which describes a multiple-stage, ferrofluid, rotary-shaft seal).

Single- and multiple-stage ferrofluid seals have been used as exclusion seals, to protect one environment on one side of the shaft from contaminants in an environment on the other side of the shaft. Ferrofluid-type exclusion seals are useful particularly with computer-disc-drive spindles, to prevent contaminants in an environment from reaching a memory-disc area.

One standard ferrofluid exclusion seal presently employed in the computer field comprises an annular, ring-like, permanent magnet adapted to surround the spindle shaft and sandwiched between two, identical, pole-piece elements which are placed at the outer diameter into a contacting, magnetic-flux relationship with the one and the other polar ends of the permanent magnet. The inner diameter of the pole-piece elements extends into a close, noncontacting relationship with the surface of the shaft or spindle, to form a small gap for example, 2 to 10 mils, between the inner diameter of the pole piece elements and the shaft surface. A ferrofluid is disposed and magnetically retained in the gaps on the insertion of the magnetically permeable shaft or spindle, to form one or more liquid O-ring stages, which serve to form a ferrofluid exclusion seal about the shaft.

A wide variety of magnetic materials may be used to provide the permanent magnet, but usually the material is a sintered or bonded ceramic material having a longitudinal thickness of about 80 to 150 mils. The pole-piece elements are composed of magnetically permeable material, such as magnetic stainless steel (for example, 400 series), and range in thickness from about 25 to 80 mils. The standard exclusion seal, depending on customer requirements, is provided as described or placed in a nonmagnetic housing, such as of aluminum or stainless steel (for example, 300 series), such as by bonding- or staking-assembly techniques.

The exclusion seal is formed by placing a precise, optimum amount of a ferrofluid in the annular gap regions between the inner diameter of the pole pieces and the spindle shaft. Typically, the ferrofluid comprises a low-vapor-pressure carrier liquid, such as a fluorocarbon, a polyphenylether, a hydrocarbon, a diester liquid and similar low-vapor-pressure liquids, to provide for a very low mass loss of the ferrofluid forming the O-ring seal, thereby providing an exclusion seal of long operating life. For example, the standard ferrofluid exclusion seal is expected generally to last for several years under moderate temperature conditions and with the currently used computer-disc-drive-spindle speeds of 3600 rpm and with shaft diameters up to about 1.8 inches. The ferrofluid used may vary in viscosity, and the saturation magnetization, which usually ranges from 20 to 500 cps, and 100 to 400 gauss respectively.

It is desirable to extend the useful operating life of ferrofluid exclusion seals, particularly under higher ambient-temperature conditions; for example, greater than 50° C., at spindle speeds that exceed 3600 rpm, and for larger shaft diameters, or a combination of these conditions.

SUMMARY OF THE INVENTION

The invention relates to a ferrofluid-type, rotary-shaft seal having an extended life and to the method of manufacturing and using such seal apparatus. In particular, the invention concerns a ferrofluid exclusion seal particularly useful with and in sealing computer-disc-drive spindles for extended time periods.

In a standard ferrofluid exclusion seal, it has been found that there are two basic design considerations— one magnetic, which determines the seal pressure, and the other heat-generation, which determines the seal life span.

Generally, the total pressure capacity of the current ferrofluid exclusion seals ranges from about 30 to 60 inches of water divided approximately equally between the two pole pieces. The pressure requirement for the usual disc-drive application is only 5 inches of water; thus, the seals have a large safety margin when it comes to pressure. In fact, even one ferrofluid O-ring seal is more than adequate to yield the required pressure capacity; however, in the present, standard design, there are two pole pieces, so that the magnetic-flux circuit will be complete.

It is known that a temperature gradient across the ferrofluid O-ring seal is produced, as a result of the heat generated by the viscous shearing of the ferrofluid between the rotating spindle shaft and the inner diameter of the stationary pole pieces. Some of this heat is conducted away through the pole pieces and the spindle shaft. Thus, the operating ferrofluid temperature depends on the heat-sink capabilities of the seal materials and structure, which, in turn, determines the ferrofluid evaporation rate and, therefore, the life of the seal. The operating fluid temperature is higher, when ferrofluid fills both gap regions, then when only one stage is activated with ferrofluid, and the other stage has an air gap under it. This results because each gap region filled with ferrofluid serves as an independent source of heat, thus raising the temperature of the seal structure to a higher value than if just one stage had been activated with ferrofluid.

Hence, unlike the seal pressure which doubles for both stages activated, as opposed to just one, seal life increases by having only one gap region filled with ferrofluid, and not both or a plurality of gap regions. Thus, an ideal situation would be one in which only one pole piece is activated with ferrofluid. A second pole piece, which would operate with an air gap, is used only to complete the magnetic circuit. The air gap aids in permitting the movement of air from the cavity between the pole pieces. The present seal-installation techniques, however, prohibit achieving this goal, since the ferrofluid is injected into the magnet area, which results in ferrofluid migration into both gap regions, upon the spindle shaft insertion.

It has been discovered that the seal life of a ferrofluid rotary-seal apparatus may be extended through the use of larger-than-usual, and preferably unequal, pole-piece widths. Present, standard, ferrofluid exclusion seals, either single- or multiple-stage, are made with pole pieces of identical pole widths; for example, 30 to 45 mils. It has been found that pole pieces of thicker width yield longer seal life, as a result of more ferrofluid in the gap formed, which provides a longer time for evaporation, and also due to the greater cross-sectional area to conduct heat away from the ferrofluid. Optimum pole-piece thickness of from 50 to 80 or more mils in thickness provides for as much as a 90% increase in seal life.

In particular, an exclusion seal, with unequal pole-piece widths, has been discovered to be advantageous particularly in extending seal life.

The standard, two-stage, ferrofluid, two-pole exclusion seal suffers from the drawback that the life of the seal is essentially the same as that of a single stage. Furthermore, due to the presence of ferrofluid under the second stage, resulting in two, independent, heat generators, the life of each single stage is worse than that obtained when the second stage has no ferrofluid under it; that is, with an air gap.

The assembly procedures for seal installation do not allow activation of only one stage with ferrofluid. It has been found that one could eliminate fluid migration to one stage, while keeping it in the other. For a seal with two, unequal, pole-piece widths, the narrow pole-piece seal fails earlier, allowing the thicker pole-piece seal to operate alone as a single-stage seal for the remainder of the seal life. The magnetic-circuit design for the thicker pole piece, alone, is still more than adequate to satisfy some seal-pressure requirements.

In forming the seal, such as in computer seals, the ferrofluid is injected into the magnet area of the unequal pole-piece seal, prior to installation in the computer-disc drive. Upon spindle-shaft insertion, the fluid is drawn out and distributed unevenly between the two stages, generally in proportion to the widths of the gaps under each end of the pole piece. Experiments performed with shaft diameters up to 1.8 inches, operating at 3600 rpm and a 6-mil radial gap, showed that the ferrofluid temperature for the thinner pole piece ran higher than that for the thicker pole piece. The difference is greater the higher the fluid viscosity of the ferrofluid. The width of the thinner pole piece is usually 25 mils; for example, 20 to 40 mils, essentially determined by mechanical-strength considerations. The thicker pole piece should have a minimum thickness of 50 mils. The life of the seal, as determined by the failure of the thicker pole piece, is about 25% to 100% longer than the standard seal life. Also, for the unequal pole-piece seal, the ferrofluid O-ring seal under the thicker pole piece may last five times as long as that for the thinner pole piece; thus extending seal life over that of the life of ferrofluid seals with the narrow or standard pole-piece elements.

The invention will be described for the purpose of illustration only in connection with a particularly preferred embodiment; however, it is recognized that those persons skilled in the art may make various changes and modifications to the described embodiment, without departing from the spirit and scope of the invention.

DESCRIPTION OF THE EMBODIMENTS

Figure 1:
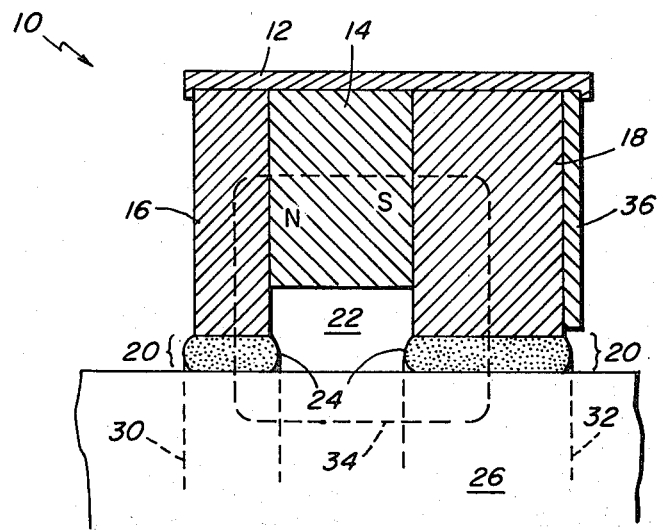
FIG. 1 is a schematic, illustrative, cross-sectional view of a ferrofluid exclusion seal of the invention at the start of operation.

FIG. 1 shows an extended-life ferrofluid-seal apparatus 10 which comprises a permanent-magnet ring 14 within a nonmagnetic housing 12, such as of aluminum or nonmagnetic stainless steel, and having pole pieces 16 and 18 sandwiched in contact with either side of the magnet 14 and adjacent opposite poles, to form an annular, sealed cavity 22 therebetween. The magnet 14 and the pole pieces 16 and 18 in housing 12 are disposed in a magnetically permeable shaft 26, such as a computer-disc-drive spindle. One end of each pole piece 16 and 18 extends into a close, noncontacting relationship with the surface of the shaft 26, to form first and second gaps 20 of defined width, typically 2 to 6 mils or larger; for example, 12 to 30 mils, as set forth in copending patent application Ser. No. 208,438 filed on the same day as this application and hereby incorporated by reference.

Ferrofluid 24, such as a diester ferrofluid of 50 to 500 cps viscosity and a magnetic saturation of 100 to 450 gauss, is retained within the gaps 20 at the end of each pole piece, to form two O-ring seals 30 and 32, shown in parallel dotted lines, on the surface of the shaft, on rotation of the shaft 26. The closed, magnetic-flux path formed is illustrated by dotted lines 34. The housing 12, optionally, has an extension of a flat-sheet, heat-conductive, nonmagnetic material 36; for example, 5 to 20 mils, of aluminum on the outside length and extending to the one end of pole piece 18, to conduct heat away from the ferrofluid 24 in gap 20 under pole piece 18, as described in copending U.S. patent application Ser. No. 208,289 filed on the same day as this application and hereby incorporated by reference.

Pole piece 18 has a greater width; for example, 50 to 80 mils, than pole piece 16; for example, 25 to 40 mils, so that the area of the O-ring seal 32 under pole piece 18 is wider, and the amount of ferrofluid 24 is greater in volume in gap 20, where the gaps 20 under pole pieces 16 and 18 are equal. The seal apparatus, as shown, provides for an extended seal life and for the failure, firstly, of the seal stage under pole piece 16, to open up cavity 22, and the formation of a single-stage seal, with the ferrofluid 24 under pole piece 18 forming the longer-life seal. Optional use of the heat-conductive extension 36 and the use of a greater gap width also extend further the seal life.

Figure 2:
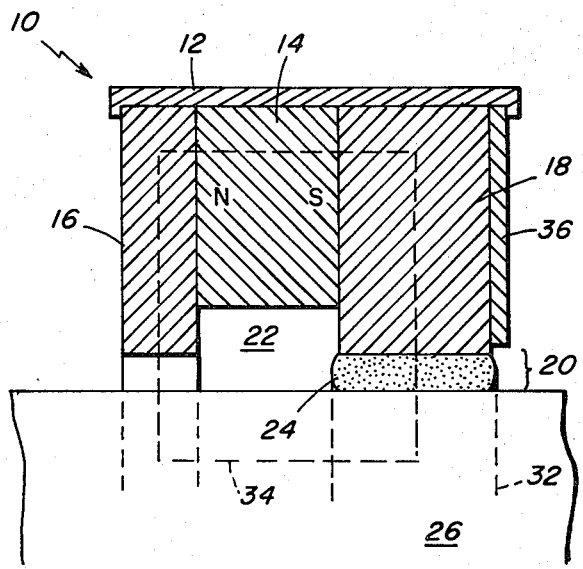
FIG. 2 is the exclusion seal of FIG. 1 after evaporation of the ferrofluid under one pole piece.

FIG. 2 illustrates the condition of the seal apparatus 10, after the ferrofluid 24 in gap 20 under pole piece 16 has failed, and the seal converted on such failure to a single-stage seal, with the ferrofluid seal under the wider pole piece 18 for extended seal life.

Experiments, comprising a standard exclusion seal with two pole pieces of identical thickness; for example, 40 mils, to an exclusion seal with one pole piece of 25 mils and the other of 55 mils in thickness, were conducted. The tests were conducted with a hydrocarbon-based ferrofluid of 50 cps viscosity and 200—gauss magnetic saturation, with a 6-mil gap width in the seal at 100° C., employing a 1.8-inch-diameter, computer-disc-drive shaft at 3600 rpm. The test data showed failure of the standard seal at about 180 hours, while the O-ring seal, under the smaller-thickness pole piece, failed at 155 hours, but the O-ring seal, under the 55-mil-width pole piece, failed after 265 hours.

What is claimed is:

1. A ferrofluid, rotary-seal apparatus having an extended seal life, which seal apparatus comprises:
   (a) an annular permanent magnet adapted to surround the rotary shaft to be sealed and having poles of opposite polarity at each end; and
   (b) first and second, magnetically permeable, pole-piece elements in a magnetic-flux relationship with the one and the other ends, respectively, of the permanent magnet, each pole piece having a one end and another end and adapted to surround the rotary shaft to be sealed and to form an air cavity therebetween, the one end of each pole-piece element adapted to extend into a close, noncontacting relationship with the surface of the shaft to be sealed, to form a radial gap therebetween, the pole-piece elements unequal in width, to form a first gap which is smaller in width than the width of the second gap, whereby a sealing amount of ferrofluid is disposed and retained in the first and second radial gaps, to form magnetic O-ring seals about the shaft, which ferrofluid will evaporate preferentially, during rotation of the shaft, from the first radial gap, to provide a seal apparatus of extended seal life, having a first air gap to the air cavity and a second ferrofluid-sealing radial gap.

2. The seal apparatus of claim 1 wherein the width of the first pole piece ranges from about 20 to 40 mils.

3. The seal apparatus of claim 1 wherein the width of the second pole piece ranges from about 50 to 80 mils.

4. The seal apparatus of claim 1 which includes a nonmagnetic, heat-conductive material in a heat-conductive relationship with the second pole piece, to reduce the temperature of the ferrofluid at the second gap.

5. The seal apparatus of claim 4 wherein the heat-conductive material is a sheet material in a contacting relationship with the outer wall of the second pole piece, and having a one end extending into a close relationship with the one end of the second pole piece and the ferrofluid in the second radial gap.

6. In combination a seal apparatus of claim 1 and a rotary-shaft element, the seal apparatus having ferrofluid in at least one gap to seal the rotary shaft.

7. The combination of claim 6 wherein the shaft element comprises a computer-disc-drive-spindle shaft.

8. A ferrofluid, rotary-seal apparatus having an extended seal life, which seal apparatus comprises:
(a) an annular permanent magnet adapted to surround the rotary shaft to be sealed and having poles of opposite polarity at each end;
(b) first and second, magnetically permeable, pole-piece elements in a magnetic-flux relationship with one and the other ends, respectively, of the permanent magnet, each pole piece having a one end and another end and adapted to surround the rotary shaft to be sealed and to form an air cavity therebetween, the one end of each pole-piece element adapted to extend into a close, noncontacting relationship with the surface of the shaft to be sealed, to form a gap therebetween, the pole-piece elements unequal in width, the width of the second pole piece being from about 50 to 80 mils, to form a first gap which is smaller in width than the width of the second gap; and
(c) a nonmagnetic, heat-conductive material in a heat-conductive relationship with the second pole piece, to reduce the temperature of the ferrofluid at the second gap, whereby ferrofluid disposed and retained in the first and second gaps, to form magnetic O-ring seals about the shaft, will evaporate preferentially, during rotation of the shaft, from the first gap, to provide a seal apparatus of extended seal life, having a first air gap and a second ferrofluid-sealing gap.

9. In a method for extending the seal life of a ferrofluid, rotary-shaft seal apparatus, which, in sealing a rotary shaft, comprises:
(a) surrounding the rotary shaft with an annular permanent magnet having one end and another end and having poles of opposite polarity at each end;
(b) surrounding the rotary shaft with first and second, magnetically permeable, pole-piece elements in a magnetic-flux relationship with one and the other ends of the permanent magnet, each pole piece having a one end and another end to form an air cavity therebetween;
(c) extending the one end of each pole piece into a close, noncontacting relationship with the surface of the rotary shaft, to form first and second radial gaps therebetween of defined width; and
(d) retaining magnetically, in the first and second radial gaps, a ferrofluid to form at least two liquid O-ring seals on the surface of the rotary shaft, to effect sealing of the rotary shaft, the improvement which comprises preferentially evaporating ferrofluid from one of the gap widths by increasing the thickness of one pole piece to change the defined gap widths, to provide for unequal first and second radial gap widths to provide an opening into the air cavity, whereby the ferrofluid will evaporate preferentially from the smallest gap width, while the ferrofluid, magnetically retained in the largest gap width, will provide a seal of extended seal life, in comparison to a seal wherein the gap widths are equal.

10. The method of claim 9 which includes conducting heat away from the ferrofluid at the large-radial gap width, to lower the rate of evaporation of the ferrofluid at the large-gap width and further extend the seal life.

11. The method of claim 10 wherein heat is conducted by employing a nonmagnetic, heat-conductive material in contact with the pole piece forming the large-gap width.

12. The method of claim 9 wherein the ferrofluid has a viscosity of from about 50 cps to 500 cps and a magnetic saturation of about 100 to 450 gauss.

13. The method of claim 9 which includes employing as the rotary shaft a computer-disc-drive-spindle shaft.

14. The method of claim 9 which includes providing first and second pole pieces unequal in width, the second pole piece having a width of from about 50 to 80 mils.

15. The seal apparatus of claim 1 wherein the pole-piece elements are of substantially uniform width throughout the length of the pole pieces.

16. The seal apparatus of claim 1 wherein the radial gap ranges from 12 to 30 mils in height from the surface of the shaft element.

17. The seal apparatus of claim 1 wherein the first and second pole pieces are the only pole pieces of the seal apparatus.

18. In combination a seal apparatus of claim 8 and a rotary-shaft element, the seal apparatus having ferrofluid in at least one gap to seal the rotary shaft.

19. The combination of claim 18 wherein the shaft element comprises a computer-disc-drive-spindle shaft.

20. The seal apparatus of claim 8 wherein the heat-conductive material is a sheet material in a contacting relationship with the outer wall of the second pole piece, and having a one end extending into a close relationship with the one end of the second pole piece and the ferrofluid in the second radial gap.

21. The seal apparatus of claim 8 wherein the pole-piece elements are of substantially uniform width throughout the length of the pole pieces.

22. The method of claim 9 which includes employing first and second pole pieces of unequal width, with the pole pieces being of substantially uniform width throughout the length of the pole pieces.

* * * * *